United States Patent
Ustimenko

(10) Patent No.: US 12,393,865 B2
(45) Date of Patent: Aug. 19, 2025

(54) METHOD AND SERVER FOR TRAINING MACHINE LEARNING ALGORITHM FOR RANKING OBJECTS

(71) Applicant: YANDEX EUROPE AG, Lucerne (CH)

(72) Inventor: Aleksey Ivanovich Ustimenko, Ivanovo (RU)

(73) Assignee: Y.E. Hub Armenia LLC, Yerevan (AM)

( * ) Notice: Subject to any disclaimer, the term of this patent is extended or adjusted under 35 U.S.C. 154(b) by 1164 days.

(21) Appl. No.: 17/223,680

(22) Filed: Apr. 6, 2021

(65) Prior Publication Data

US 2021/0319359 A1    Oct. 14, 2021

(30) Foreign Application Priority Data

Apr. 13, 2020  (RU) .......................... RU2020113384

(51) Int. Cl.
  *G06N 20/00*  (2019.01)
  *G06F 16/2457*  (2019.01)
  *G06N 5/01*  (2023.01)

(52) U.S. Cl.
  CPC ....... *G06N 20/00* (2019.01); *G06F 16/24578* (2019.01); *G06N 5/01* (2023.01)

(58) Field of Classification Search
  CPC ..... G06N 20/00; G06N 5/01; G06F 16/24578
  See application file for complete search history.

(56) References Cited

U.S. PATENT DOCUMENTS 6,725,208 B1   4/2004  Hartman et al.
7,313,550 B2   12/2007 Kulkarni et al.
(Continued)

FOREIGN PATENT DOCUMENTS

RU    2632143 C1    10/2017
WO    03081527 A1   10/2003

OTHER PUBLICATIONS

Gulin et al., Winning the transfer learning track of yahoo!'s learning to rank challenge with yetirank. In Proceedings of the Learning to Rank Challenge Jan. 26, 2011 (Year: 2011).*

(Continued)

*Primary Examiner* — Michael J Huntley
*Assistant Examiner* — Adam C Standke
(74) *Attorney, Agent, or Firm* — BCF LLP

(57) ABSTRACT

Method and server for training a Machine Learning Algorithm (MLA) for ranking objects in response to a query are disclosed. The training includes use of a ranking quality metric function that is one of a flat and a discontinuous function to determine a performance score of the MLA. The method includes generating relevance scores for a set of training objects based on data associated with the set of training objects and a training query, generating noise-induced relevance scores for the set of training objects by combining the relevance scores and noise values, generating the performance score for the MLA based on the noise-induced relevance scores, determining a policy gradient value for adjusting relevance scores to be generated by the MLA for the in-use objects in response to the in-use query, and applying the policy gradient value for training the MLA to rank in-use objects in response to an in-use query.

19 Claims, 5 Drawing Sheets

(56) References Cited

U.S. PATENT DOCUMENTS

| | | | |
|---|---|---|---|
| 7,472,096 | B2 | 12/2008 | Burges et al. |
| 7,558,764 | B2 | 7/2009 | Abe et al. |
| 8,275,721 | B2 | 9/2012 | Abe et al. |
| 10,510,002 | B1 | 12/2019 | Olabiyi et al. |
| 10,510,003 | B1 | 12/2019 | Olabiyi et al. |
| 10,963,814 | B2 | 3/2021 | Gupta et al. |
| 2006/0195440 | A1 | 8/2006 | Burges et al. |
| 2007/0094171 | A1 | 4/2007 | Burges et al. |
| 2009/0006360 | A1 | 1/2009 | Liao et al. |
| 2017/0097936 | A1 | 4/2017 | Glover |
| 2017/0293859 | A1 | 10/2017 | Gusev et al. |
| 2017/0364810 | A1 | 12/2017 | Gusev et al. |
| 2018/0121730 | A1 | 5/2018 | Li |
| 2018/0225291 | A1* | 8/2018 | Balinsky ............... G06F 40/284 |
| 2019/0212977 | A1 | 7/2019 | Sicurelli, III et al. |
| 2019/0303795 | A1 | 10/2019 | Khiari et al. |
| 2020/0401149 | A1 | 12/2020 | Gong et al. |
| 2021/0201112 | A1 | 7/2021 | Gauthier Melançon et al. |
| 2021/0374553 | A1 | 12/2021 | Li et al. |

OTHER PUBLICATIONS

Bruch et al., A stochastic treatment of learning to rank scoring functions. In Proceedings of the 13th international conference on web search and data mining (Year: Jan. 20, 2020).*

Gui in et al., Winning the transfer learning track of yahoo!'s learning to rank challenge with yeti rank. In Proceedings of the Learning to Rank Challenge Jan. 2, 20116 (Year: 2011).*

Office Action issued on Jun. 17, 2024 in respect of the related U.S. Appl. No. 17/207,403.

Sukhbaatar et al., "Training Convolutional Networks with Noisy Labels", ICLR 2015, arXiv, Apr. 2015, pp. 1-11.

Agarwal et al., "Counterfactual Learning-to-Rank for Additive Metrics and Deep Models", https://www.cs.cornell.edu/people/tj/publications/agarwal_etal_18b.pdf, 10 pages.

Sukhbaatar et al., "Learning from Noisy Labels with Deep Neural Networks", Computer Science, Artificial Intelligence, Evolutionary Computing, arXiv, Jun. 2014, pp. 1-10.

Viegas da Silva et al., "PCA and Gaussian noise in MLP neural network training improve generalization in problems with small and unbalanced data sets", The 2011 International Joint Conference on Neural Networks, USA, 2011, pp. 2664-2669.

Ustimenko et al., "SGLB: Stochastic Gradient Langevin Boosting", Yandex.Research, Moscow, Russia, Computer Science > Machine Learning, 2020, https://arxiv.org/abs/2001.07248v2, 10 pages.

Friedman, "Stochastic Gradient Boosting", 1999, pp. 1-10.

"CatBoost is a high-performance open source library for gradient boosting on decision trees", https://catboost.ai accessed on Jan. 26, 2021, pdf 5 pages.

Chen et al., "Accelerating Nonconvex Learning Via Replica Exchange Langevin Diffusion", Published as a conference paper at ICLR 2019, pp. 1-23.

Ge et al., "Escaping From Saddle Points—Online Stochastic Gradient for Tensor Decomposition", Computer Science > Machine Learning, 2015, https://arxiv.org/abs/1503.02101v1, pp. 1-46.

Xu et al., "Global Convergence of Langevin Dynamics Based Algorithms for Nonconvex Optimization", Statistics > Machine Learning, 2020, https://arxiv.org/abs/1707.06618, pp. 1-36.

Welling et al., "Bayesian Learning via Stochastic Gradient Langevin Dynamics", Proceedings of the 28 th International Conference on Machine Learning, USA, 2011, pp. 1-8.

Ahn, "Bayesian Posterior Sampling via Stochastic Gradient Fisher Scoring", Proceedings of the 29 th International Conference on Machine Learning, UK, 2012, pp. 1-8.

Kamalaruban et al., "Reinforcement Learning with Langevin Dynamics", Optimization Foundations for Reinforcement Learning Workshop at NeurIPS, Vancouver, 2019, 8 pages.

Zhang et al., "A Hitting Time Analysis of Stochastic Gradient Langevin Dynamics", arXiv:1702.05575v3, 2018, pp. 1-44.

Patterson et al., "Stochastic Gradient Riemannian Langevin Dynamics on the Probability Simplex", Advances in Neural Information Processing Systems, 2013, pp. 1-9.

Mou et al., "Generalization Bounds of SGLD for Non-convex Learning: Two Theoretical Viewpoints", Computer Science > Machine Learning, 2017, aarXiv.org > cs > arXiv:1707.05947, 2017, pp. 1-29.

Zou et al., "Subsampled Stochastic Variance-Reduced Gradient Langevin Dynamics", Mathematics, Computer Science, 2018, 11 pages.

Wang, "Quadratic Majorization for Nonconvex Loss with Applications to the Boosting Algorithm", Journal of Computational and Graphical Statistics, 2018, pp. 1-41.

Wang et al., "Gradient Boosting", MachineLearning, 2020, pp. 1-30.

Liu et al., "Stochastic Non-convex Optimization with Strong High Probability Second-order Convergence", Mathematics > Optimization and Control, arXiv:1710.09447v2, 2017, pp. 1-8.

Raginsky et al., "Non-Convex Learning via Stochastic Gradient Langevin Dynamics: A Nonasymptotic Analysis", arXiv:1702.03849v3 [cs.LG], 2017, 30 pages.

Matias Valdenegro-Toro, "Deep Sub-Ensembles for Fast Uncertainty Estimation in Image Classification", Published on Nov. 29, 2019, 7 pages, arXiv:1910.08168v2 [cs.LG].

Office Action issued on Sep. 6, 2024 in respect of the related U.S. Appl. No. 17/351,719.

Notice of Allowance dated Oct. 15, 2024 received in respect of a related U.S. Appl. No. 17/207,403.

Russian Search Report dated Jul. 14, 2022 issued in respect of the counterpart Russian Patent Application No. RU 2020113384.

Wickstrom et al. "Uncertainty-Aware Deep Ensembles for Reliable and Explainable Predictions of Clinical Time Series", Published on Oct. 16, 2020, arXiv:2010.11310v1 [cs.LG].

Zeldes "Using Uncertainty to Interpret your Model", article published on Nov. 8, 2018, retrieved on Jan. 6, 2025, https://www.datasciencecentral.com/using-uncertainty-to-interpret-your-model/.

Office Action issued on Dec. 27, 2024 in respect of the related U.S. Appl. No. 17/351,719.

* cited by examiner

METHOD AND SERVER FOR TRAINING MACHINE LEARNING ALGORITHM FOR RANKING OBJECTS

CROSS-REFERENCE

The present application claims priority to Russian Patent Application No. 2020113384, entitled "METHOD AND SERVER FOR TRAINING MACHINE LEARNING ALGORITHM FOR RANKING OBJECTS," filed on Apr. 13, 2020, the entirety of which is incorporated herein by reference.

FIELD

The present technology relates to Search Engine Results Pages (SERPs) in general and, specifically, to a method and server for training a Machine Learning Algorithm for ranking objects in response to a query.

BACKGROUND

The Internet provides access to a wide variety of resources, for example, video files, image files, audio files, or Web pages. Search engines are used to search these resources. For example, digital images that satisfy a user's informational need can be identified by a search engine in response to receiving a user query submitted by a user. User queries can be composed of one or more query terms. The search system selects and ranks search results based on their relevance to the user query and/or on their importance relative to other search results and also provides top search results to the user.

Many state-of-the-art ranking algorithms are employed in order to rank search results on a given Search Engine Results Page (SERP) that is generated and provided to a user having submitted a query.

SUMMARY

Developers of the present technology have appreciated certain technical drawbacks associated with the existing search systems.

In a first broad aspect of the present technology, there is provided a computer-implemented method for training a Machine Learning Algorithm (MLA) for ranking objects in response to a query. The MLA is executed by a server having access to the objects and the query. The training including use of a ranking quality metric function that is one of a flat and a discontinuous function to determine a performance score of the MLA. The method is executable by the server. The method comprises generating, by the server executing the MLA, relevance scores for a set of training objects based on data associated with (i) the set of training objects and (ii) a training query. The relevance scores is indicative of an estimated relevance of a respective training object to the training query. The method comprises generating, by the server, noise-induced relevance scores for the set of training objects by combining the relevance scores and noise values. The noise values have been generated based on a noise-inducing function having a pre-determined distribution. The method comprises generating, by the server, the performance score for the MLA based on the noise-induced relevance scores. The performance score is indicative of a ranking quality of the MLA if the training objects from the set of training objects are ranked in accordance with the respective noise-induced relevance scores. The method comprises determining, by the server, a policy gradient value for adjusting relevance scores to be generated by the MLA for the in-use objects in response to the in-use query. The policy gradient value is determined based on a combination of (i) the performance score, (ii) the relevance scores, and (iii) the noise-induced relevance scores for the set of training objects. The method comprises applying, by the server, the policy gradient value for training the MLA to rank in-use objects in response to an in-use query.

In some embodiments of the method, the generating the performance score based on the noise-induced relevance scores allows the determining the policy gradient value.

In some embodiments of the method, the applying the policy gradient value comprises applying, by the server, a weighted policy gradient value for training the MLA. The weighted policy gradient is determined as a combination of (i) the policy gradient value and (ii) a pre-determined weight value.

In some embodiments of the method, the MLA is a decision-tree-based algorithm having a set of decision trees, and the applying the policy gradient value comprises at least one of: generating, by the server, an additional decision-tree for the MLA based on the policy gradient value, and modifying, by the server, at least one of the set of decision-trees of the MLA based on the policy gradient value.

In some embodiments of the method, the applying the policy gradient value for training directly optimizes the ranking quality of the MLA.

In some embodiments of the method, the determining the policy gradient value comprises estimating, by the server, the policy gradient value by employing a coordinate-wise antithetic sampling method.

In some embodiments of the method, the estimating the policy gradient value by employing the coordinate-wise antithetic sampling method comprises estimating, by the server, the policy gradient value as:

$$d_i = \frac{1}{K}\sum_{j=1}^{K} \frac{\wp_j - f(r + n_j^i)}{2} n_{ji}$$

wherein:
  $d_i$ is a policy gradient value for training object i in the set of training objects;
  K is a number of noise-induced relevance score samples;
  j is a given noise-induce relevance score sample;
  $\wp_j$ is a performance score for a jth noise-induced relevance score sample;
  r is a vector representative of the set of relevance scores for the set of training objects, including the training object i;
  $n_j$ is a vector representative of a set of noise values for the set of training objects, including the training object i, during the given sample j;
  $n_j^i$ is a vector representative of a set of noise values for the set of training objects, including the training object i, where a sign of a noise value for the training object i during the given sample j is inversed;
  $n_{ji}$ is a noise value for the training object i during the given sample; and
  f( ) is the ranking quality metric function.

In some embodiments of the method, the applying the policy gradient value is performed by the server in an off-line mode.

In some embodiments of the method, the applying the policy gradient value is performed by the server prior to employing the MLA in an in-use phase.

In some embodiments of the method, the pre-determined distribution is at least one of: a Gaussian distribution, a Cauchy distribution, and a Laplace distribution.

In some embodiments of the method, the ranking quality metric function is one of: a Normalized Discounted Cumulative Gain (NDCG) quality metric function, an Expected reciprocal Rank (ERR) quality metric function, a Mean Average Precision (MAP) quality metric function, and a Mean Reciprocal Rank (MRR) quality metric function.

In some embodiments of the method, the training objects are electronic documents and the training query is a previously submitted query to a search engine. The search engine is hosted on the server.

In some embodiments of the method, the method further comprises ranking, by the server, the in-use objects in response to the in-use query, and triggering, by the server, display of a Search Engine Results Page (SERP) to a user associated with the in-use query. The SERP is listing the in-use objects in a ranked order.

In a second broad aspect of the present technology, there is provided a server for training a Machine Learning Algorithm (MLA) for ranking objects in response to a query. The MLA is executed by the server having access to the objects and the query. The training includes use of a ranking quality metric function that is one of a flat and a discontinuous function to determine a performance score of the MLA. The server is configured to generate, by executing the MLA, relevance scores for a set of training objects based on data associated with (i) the set of training objects and (ii) a training query. The relevance scores is indicative of an estimated relevance of a respective training object to the training query. The server is configured to generate noise-induced relevance scores for the set of training objects by combining the relevance scores and noise values. The noise values have been generated based on a noise-inducing function having a pre-determined distribution. The server is configured to generate the performance score for the MLA based on the noise-induced relevance scores. The performance score is indicative of a ranking quality of the MLA if the training objects from the set of training objects are ranked in accordance with the respective noise-induced relevance scores. The server is configured to determine a policy gradient value for adjusting relevance scores to be generated by the MLA for the in-use objects in response to the in-use query. The policy gradient value is determined based on a combination of (i) the performance score, (ii) the relevance scores, and (iii) the noise-induced relevance scores for the set of training objects. The server is configured to apply the policy gradient value for training the MLA to rank in-use objects in response to an in-use query.

In some embodiments of the server, the server configured to generate the performance score based on the noise-induced relevance scores allows the determining the policy gradient value.

In some embodiments of the server, the server configured to apply the policy gradient value comprises the server configured to apply a weighted policy gradient value for training the MLA. The weighted policy gradient is determined as a combination of (i) the policy gradient value and (ii) a pre-determined weight value.

In some embodiments of the server, the MLA is a decision-tree-based algorithm having a set of decision trees, and the server configured to apply the policy gradient value comprises the sever configured to at least one of: generate an additional decision-tree for the MLA based on the policy gradient value, and modify at least one of the set of decision-trees of the MLA based on the policy gradient value.

In some embodiments of the server, the server configured to apply the policy gradient value for training directly optimizes the ranking quality of the MLA.

In some embodiments of the server, the server configured to determine the policy gradient value comprises the server configured to estimate the policy gradient value by employing a coordinate-wise antithetic sampling method.

In some embodiments of the server, the server configured to estimate the policy gradient value by employing the coordinate-wise antithetic sampling method comprises the server configured to estimate the policy gradient value as:

$$d_i = \frac{1}{K}\sum_{j=1}^{K} \frac{\wp_j - f(r + n_j^i)}{2} n_{ji}$$

wherein:
  $d_i$ is a policy gradient value for training object i in the set of training objects;
  K is a number of noise-induced relevance score samples;
  j is a given noise-induce relevance score sample;
  $\wp_j$ is a performance score for a jth noise-induced relevance score sample;
  r is a vector representative of the set of relevance scores for the set of training objects, including the training object i;
  $n_j$ is a vector representative of a set of noise values for the set of training objects, including the training object i, during the given sample j;
  $n_j^i$ is a vector representative of a set of noise values for the set of training objects, including the training object i, where a sign of a noise value for the training object i during the given sample j is inversed; and
  f( ) is the ranking quality metric function.

In some embodiments of the server, the sever is configured to apply the policy gradient in an off-line mode.

In some embodiments of the server, the sever is configured to apply the policy gradient prior to employing the MLA in an in-use phase.

In some embodiments of the server, the pre-determined distribution is at least one of: a Gaussian distribution, a Cauchy distribution, and a Laplace distribution.

In some embodiments of the server, the ranking quality metric function is one of: a Normalized Discounted Cumulative Gain (NDCG) quality metric function, an Expected reciprocal Rank (ERR) quality metric function, a Mean Average Precision (MAP) quality metric function, and a Mean Reciprocal Rank (MRR) quality metric function.

In some embodiments of the server, the training objects are electronic documents and the training query is a previously submitted query to a search engine. The search engine is hosted on the server.

In some embodiments of the server, the server is further configured to: rank the in-use objects in response to the in-use query, and trigger display of a Search Engine Results Page (SERP) to a user associated with the in-use query. The SERP is listing the in-use objects in a ranked order.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Furthermore, APPENDIX A has been enclosed following the Detailed Description. The APPENDIX A comprises an article providing information regarding at least some aspects of the present technology described herein and/or additional aspects of the present technology. The APPENDIX A and the information forming part thereof have been enclosed for reference purposes and are to be deleted from the application prior to the publication of the application as a patent.

DETAILED DESCRIPTION

Figure 1:
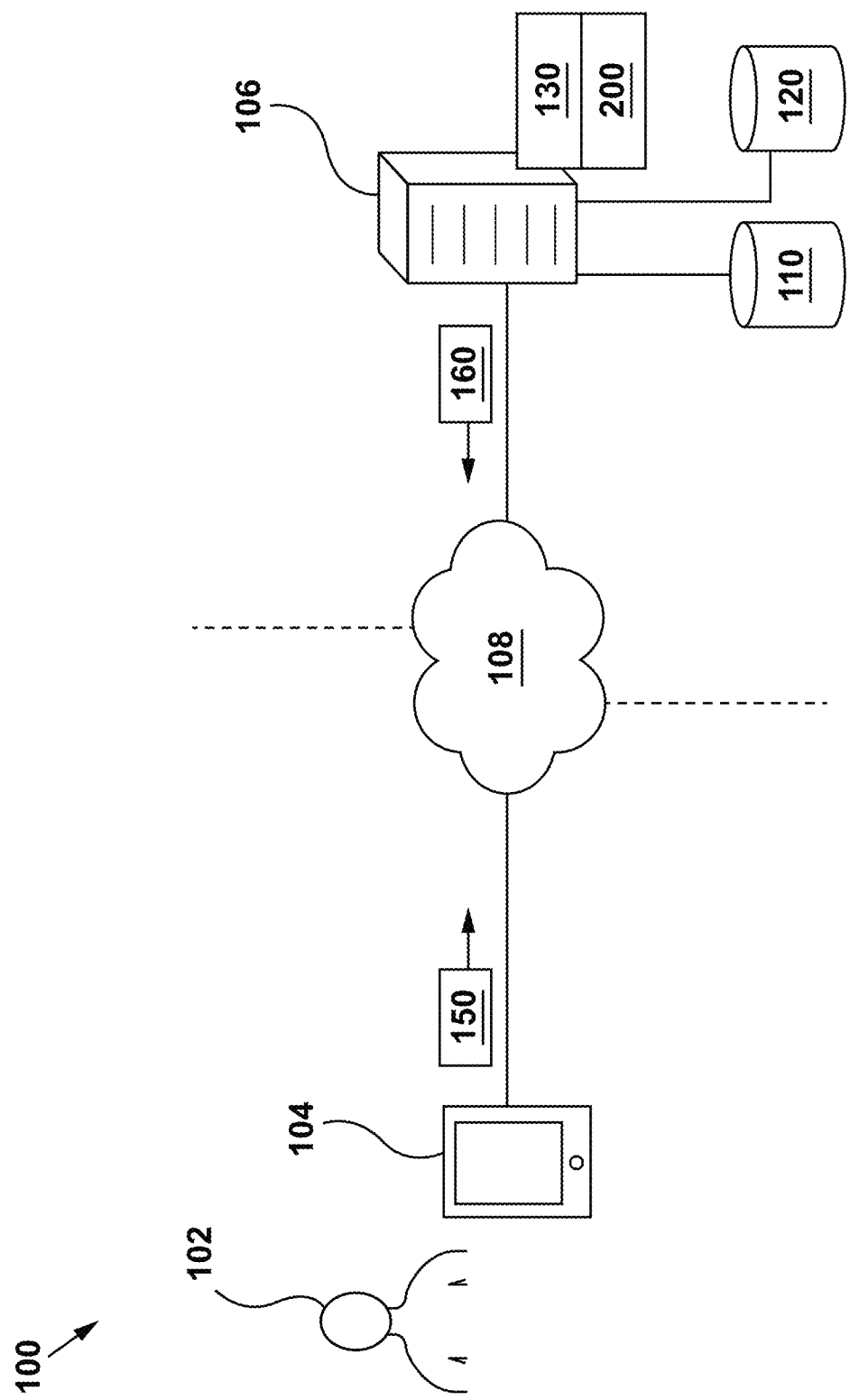
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to generate and provide a given Search Engine Results Page (SERP), comprising various search results, to an electronic device 104 for display thereof to a user 102 in response to a given query provided by the user 102. At least some components of the system 100 will now be described, however in other embodiments, other components to those depicted in FIG. 1 may be part of the system 100 without departing from the scope of the present technology.

Electronic Device

The system 100 comprises the electronic device 104, the electronic device 104 being associated with the user 102. As such, the electronic device 104 can sometimes be referred to as a "client device", "end user device", "client electronic device" or simply "device". It should be noted that the fact that the device 104 is associated with the user 102 does not need to suggest or imply any mode of operation—such as a need to log in, a need to be registered, or the like.

The implementation of the device 104 is not particularly limited, but as an example, the device 104 may be implemented as a personal computer (desktops, laptops, netbooks, etc.), a wireless communication device (such as a smartphone, a cell phone, a tablet and the like), as well as network equipment (such as routers, switches, and gateways). The device 104 comprises hardware and/or software and/or firmware (or a combination thereof), as is known in the art, to execute a given browser application. Generally speaking, the purpose of the given browser application is to enable the user 102 to access one or more web resources. How the given browser application is implemented is not particularly limited. One example of the given browser application may be embodied as a Yandex™ browser.

In some embodiments of the present technology, the given browser application implemented by the device 104 may allow the user 102 to submit search queries to a given search engine (for example, hosted by a server 106) and display SERPs responsive to submitted queries to the user 102. Generally speaking, the given search engine is a system configured to receive queries from plurality of users, search for information responsive to the received queries and generate SERPs comprising search results that are ranked based on their relevance to the received queries. Some examples of the given search engine may be embodied as a Yandex™ search engine, Google™ search engine, Yahoo™ search engine, and the like.

For example, the user 102 may use the given browser application to input/submit a current query and the device 104 may be configured to generate a query data-packet 150 comprising data indicative of the current query of the user 102. It is contemplated that a plurality of data-packets may be generated by a plurality of devices of the system 100 similarly to how the device 104 is configured to generate the query data-packet 150 based on the current query inputted/submitted by the user 102 into the given browser application, without departing from the scope of the present technology.

Communication Network

The device 104 is communicatively coupled to the communication network 108 for accessing the given search engine of the server 106. In some non-limiting embodiments of the present technology, the communication network 108 can be implemented as the Internet. In other non-limiting embodiments of the present technology, the communication network 108 can be implemented differently, such as any wide-area communication network, local-area communication network, a private communication network and the like. How a communication link (not separately numbered) between the device 104 and the communication network 108 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

The communication network 108 is configured to transmit inter alia the query data-packet 150 from the device 104 to the server 106 and a SERP data-packet 160 from the server 106 to the device 104. For example, the SERP data-packet 160 may comprise data indicative of a given SERP generated by the server 106 and which comprises search results responsive the current query of the user 102. How the server 106 is configured to generate the SERP data-packet 160 and the given SERP will be described in greater detail herein below.

Server

The system 100 also comprises the server 106 that can be implemented as a computer server. In an example of an embodiment of the present technology, the server 106 can be implemented as a Dell™ PowerEdge™ Server running the Microsoft™ Windows Server™ operating system. Needless to say, the server 106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Generally speaking, the server 106 can be under control and/or management of a search engine provider (not depicted), such as, for example, an operator of the given search engine (e.g., Yandex™ search engine). Hence, as previously mentioned, the server 106 can host the given search engine. As such, the server 106 may be configured to execute one or more information searches responsive to queries submitted by users of the given search engine.

The server 106 is configured to execute at least some of the plurality of computer-implemented procedures 200, which will now be described with reference to FIG. 2. In other embodiments, the server 106 may also execute additional computer-implemented procedures to those non-exhaustively depicted in FIG. 2 and without departing from the scope of the present technology.

The server 106 may be configured to execute an object discovery procedure 202, which is generally used by the server 106 for discovering digital objects available over the communication network 108. For example, the server 106 may be configured to execute a "crawler" application that "visits" network resources available over the communication network 108 and downloads them for further processing.

The nature of digital objects that the server 106 is configured to visit and download is not particularly limiting but, for sake of illustration only, the digital objects described herein may be digital documents representative of web pages that are available over the communication network 108. In another example, the digital objects described herein may be digital images, digital sound recordings, digital videos and other types of digital media.

It should be noted that in the context of the present description, the digital objects will be referred to as "digital documents" or "documents" for the sake of simplicity only. However, it is contemplated that concepts disclosed herein apply to other types of digital objects, similarly to how they are applied to digital documents, without departing from the scope of the present technology.

The server 106 may also be configured to execute an indexing procedure 204, which is generally used by the server 106 for building and/or maintaining indexing structures employed by the given search engine for performing searches. For example, the server 106 may be configured to build and/or maintain an inverted index.

How the inverted index is implemented in the present technology is not particularly limiting but, just as an example, the inverted index basically comprises a number of posting lists each on which is associated with a respective "searchable term". A given posting in a given posting list includes some type of data that is indicative of a given document that includes the searchable term associated with the given posting list and, optionally, includes some additional data. In summary, every posting list corresponds to a searchable term, and comprises a series of postings referencing each of the discovered documents that contain at least one occurrence of that respective searchable term.

It should be mentioned that additional data may also be found in a given posting; for example, the number of occurrences of a given searchable term in a given document; whether this search term occurs in the title of the given document, etc. Naturally, this additional data may be different depending on the given search engine and inter alia various implementations of the present technology.

Searchable terms are typically, but not exclusively, words or other character strings. A given search engine may typically deal with practically every word in a number of different languages, as well as proper names, numbers, symbols, etc. A very commonly used word may have a posting list of as long as one billion postings (or even more). In some embodiments of the present technology, the search query can also be an image-based search query for searching "look alike" images. In other embodiments, the search query can also be a sound-based search query for searching digital sound recording including the sound-based query.

The server 106 may also be configured to execute a querying procedure 206, which is generally used by the server 106 for identifying documents that may contain some part of a given query submitted to the given search engine. For example, when a given query (such as the current query of the user 102, for example) is received by the server 106, the server 106 may parse the given query into a plurality of searchable terms. The server 106 may then access the inverted index and identify posting lists that are associated with at least one of the plurality of searchable terms. As a result, the server 106 may access at least some postings in the so-identified posting lists and identify at least some documents that may contain at least some of the plurality of searchable terms of the given query.

The server 106 may also be configured to execute a relevance estimation procedure 208, which is generally used to estimate a relevance of a given document to a given query. For example, the server 106 may be configured to implement a Machine Learning Algorithm (MLA) 130, as seen in FIGS. 1 and 2, which has been trained to estimate a relevance of a given document to a given query.

Broadly speaking, the MLA 130 may be configured to estimate the relevance of the given document to a given query based on inter alia (i) features of the given document (e.g., data associated with the given document) and (ii) features of the given query (e.g., data associated with the given query). How the MLA 130 is trained and then used in order to estimate relevance of documents to a given query will be described with reference to FIG. 4 herein further below.

It should be noted that, in some embodiments of the present technology, the execution of the relevance estimation procedure 208 may result in the server 106 being configured to rank documents, with respect to one another, based on respective relevance scores (generated by the MLA 130) that are indicative of the estimated relevance of the respective documents to a given query.

The task of ranking documents in response to a given query is not a trivial one. This is generally referred to in the art as the Learning-to-rank (L2R) problem. The quality of an algorithm that may be employed by the server 106 for ranking purposes is traditionally measured by an output of what is called a "ranking quality metric function". For example, once a given algorithm is used for ranking documents, a ranking quality metric function is then used to determine "a performance score" that is a measure indicative of the ranking quality of the algorithm having been used for ranking the documents (for example, via a comparison of a so-ranked list of documents to a ground-truth about those documents).

Just as examples, ranking quality metric functions include, but not limited to:
  Normalized Discounted Cumulative Gain (NDCG) quality metric function;
  Expected Reciprocal Rank (EPR) quality metric function;
  Mean Average Precision (MAP) quality metric function; and
  Mean Reciprocal Rank (MRR) quality metric function.

It can be said that a ranking quality metric function may be applied on a relevance-ranked list of documents (relevance scores of which have been determined by the given algorithm), and the performance score resulting from this application, in a sense, "captures" the utility of documents being ranked in that order for the user having submitted the given query to the search engine.

In summary, the L2R problem can be reformulated as an optimization problem with respect to a given ranking quality metric function. Put another way, the goal is to train the given algorithm to generate relevance scores for documents such that, when those documents are ranked based on the respective relevance scores, the performance score (determined by applying a given ranking quality metric function onto the relevance-ranked list of documents) is optimized.

In at least some embodiments of the present technology, developers of the present technology have devised methods and systems for training the MLA 130 to generate relevance scores for documents (that are then to be ranked based on these relevance scores) in a manner that aims to optimize the ranking quality of the MLA 130.

Such optimization is a challenging problem arising from the fact that performance scores obtained by applying a given ranking quality metric function depend on ranks of documents, which themselves are determined by ordering the documents based on the estimated relevance scores (e.g., the output of the given algorithm). Put another way, the given algorithm is tasked with estimating relevance of documents to a given query, but is trained on information derivable from the order in which those documents are ranked in accordance with the estimated relevance. This makes ranking quality metric functions either flat or discontinuous; hence they are neither convex nor smooth.

To better illustrate these properties of ranking quality metric functions, let it be assumed that a given algorithm generates relevance scores for a set of documents and that these documents are then ranked based on the respective relevance scores into a first ranked list of documents. When a given ranking quality metric function is applied onto the first ranked list of documents, a first performance score is generated.

Now let it be assumed that the given algorithm generates slightly different (or generally similar) relevance scores for the set of documents and that the documents are then ranked based on the respective slightly different (or generally similar) relevance scores into a second ranked list of documents.

Due to the slightly different relevance scores of the respective documents, at least some documents may have a different rank in the first ranked list of documents and in the second ranked list of documents. However, when the given ranking quality metric function is applied onto the second ranked list of documents, a second performance score generated for the second ranked list of documents may be significantly different from the first performance score, although the relevance scores themselves for documents in the first and second ranked lists of documents (as determined by the given algorithm) are generally similar.

Different approaches may be used to optimize the ranking quality of algorithms that are used for ranking documents based on estimated relevance and which typically fall within one of the following: point-wise approach, pair-wise approach, and list-wise approach. Just as examples, algorithms employable for optimizing the ranking quality of algorithms that are used for ranking documents based on the estimated relevance may include, but not limited to: LambdaMART algorithm, NDCG-Loss2++ algorithm, Soft-Rank algorithm, and the like.

Developers of the present technology have realized that existing algorithms employable during optimization of the ranking quality of algorithms that are used for ranking documents based on the estimated relevance have multiple drawbacks.

In at least some embodiments of the present technology, the developers of the present technology have devised methods and systems that provide a framework, which in contrast to LambdaMART, LambdaLoss and SoftRank algorithms (for example), allows for direct optimization of any ranking quality measure (performance scores determined by a given ranking quality metric function). It is contemplated that in at least some embodiments of the present technology, this framework may be applied by the server 106 during the training phase of the MLA 130. How the server 106 is configured to perform the training phase of the MLA 130 in accordance with this novel framework will be described in greater details herein further below.

The server 106 may also be configured to execute a SERP generation procedure 210, which is generally used to trigger display of relevant information to the user 102 in response to the current query. For example, during the SERP generation procedure 210, the server 106 may generate a given SERP that lists a number of search results representative of the documents that have been ranked based on their respective relevance scores. Put another way, the server 106 may generate the given SERP such that the search results included thereon are representative of respective documents and are ranked in the same order as the documents that have been ranked based on their estimated relevance to the current query.

Search Engine Data Repository

Returning to FIG. 1, the server 106 has access to the search engine data repository 110. Broadly speaking, the search engine data repository 110 is configured to store information associated with the search engine of the server 106. Although the search engine data repository 110 is illustrated in FIG. 1 as a separate entity from the server 106, it is contemplated that the search engine data repository 110 may be an integral component of the server 106.

For example, the search engine data repository 110 may store information about previously performed searches by the given search engine. In another example, the search engine data repository 110 may store information about previously submitted queries to the server 106 and about documents that have been provided by the search engine of the server 106 as search results.

It is contemplated that the search engine data repository 110 may store query data associated with respective queries. Query data associated with a given query may be of different types and is not limiting. For example, the search engine data repository 110 may store query data for respective queries such as, but not limited to:

popularity of a given query;
frequency of submission of the given query;
number of clicks associated with the given query;
indications of other submitted queries associated with the given query;
indications of documents associated with the given query;
other statistical data associated with the given query;
text associated with the given query;
number of characters within the given query; and
other query-intrinsic characteristics of the given query.

As it will be described herein further below, at least some query data may be used by the server 106 during training of the MLA 130 for performing the relevance estimation procedure 208.

The search engine data repository 110 may also store document data associated with respective documents. Document data associated with a given document may be of different types and is not limiting. For example, the search engine data repository 110 may store document data for respective documents such as, but not limited to:

popularity of a given document;
click-through-rate for the given document;
time-per-click associated with the given document;
indications of other documents associated with the given document;
indications of queries associated with the given document;
other statistical data associated with the given document;
text associated with the given document;
memory size of the given document; and other document-intrinsic characteristics of the given document.

As it will be described herein further below, at least some document data may be used by the server 106 during training of the MLA 130 for performing the relevance estimation procedure 208.

Figure 3:
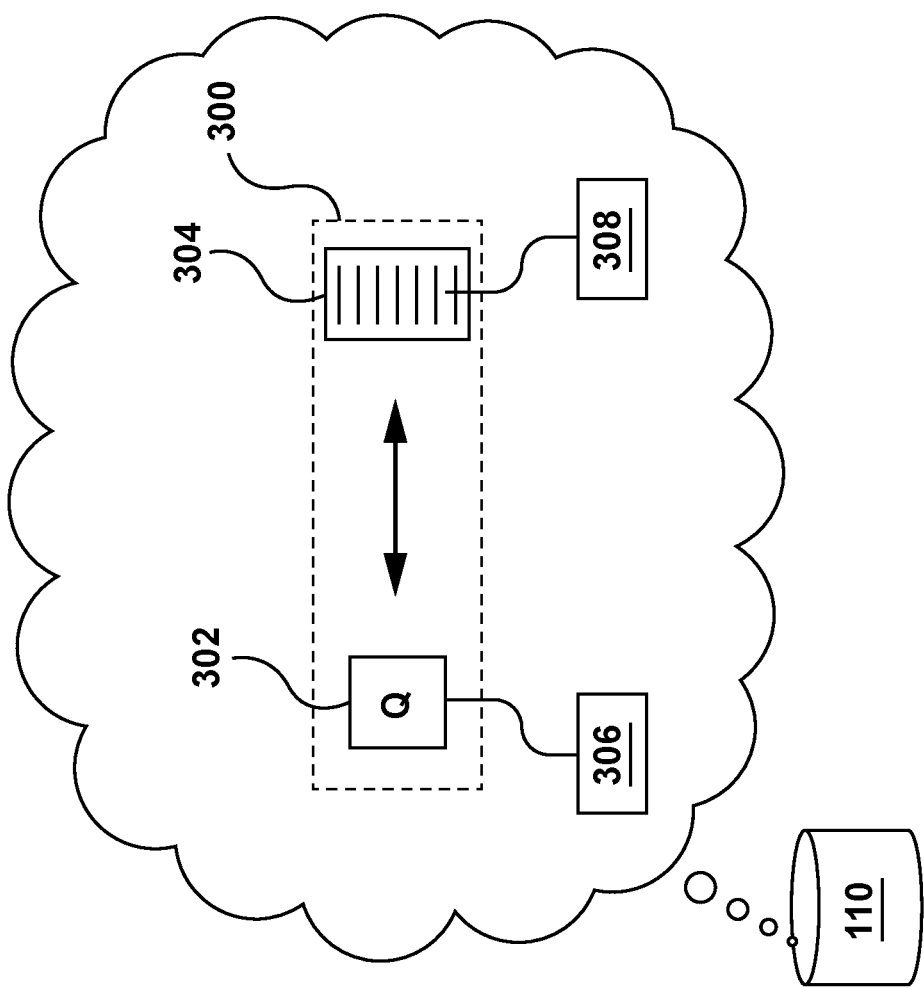
FIG. 3 depicts data stored in a search engine repository of FIG. 1 in accordance with non-limiting embodiments of the present technology.

It is contemplated that the search engine data repository 110 may also store information in a form of "query-document pairs". For example, with reference to FIG. 3, the search engine data repository 110 may store a large number of query-document pairs similar to a query-document pair 300. The query-document pair 300 comprises a query 302 and a document 304. For example, the query 302 may be a previously submitted query to the server 106, while the document 304 may be a previously provided document by the search engine in response to the query 302.

As explained above, the search engine data repository 110 may store query data associated with respective queries and document data associated with respective documents. For example, the search engine data repository 110 may store the query 302 in association with query data 306, while storing the document 304 in association with document data 308.

It is also contemplated that the search engine data repository 110 may store additional data (to that illustrated in FIG. 3) in association with a given query-document pair, without departing from the scope of the present technology. Just as an example, the search engine data repository 110 may store additional data in associated with the query-document pair 300 that is indicative of pair-specific information such as, but not limited to, a number of times the document 304 appeared as a search result in response to the query 302.

The server 106 may be configured to use the information stored in the search engine data repository 110 as training data for training the MLA 130. It is also contemplated that the server 106 may also use the information stored in the search engine data repository 110 during the in-use phase of the MLA 130. How the server 106 is configured to use the information stored in the search engine data repository 110 will be described in greater details herein below.

Operational Repository

Returning to FIG. 1, the server 106 has access to the operational repository 120. Broadly speaking, the operational repository 120 may be used by the server 106 in order to store, temporarily or permanently, information that is determined/generated by the server 106 during its operation for future use thereof. Although the operational repository 120 is illustrated in FIG. 1 as a separate entity from the server 106 and from the search engine data repository 110, this may not be the case in each and every embodiment of the present technology. Just as an example, it is contemplated that the operational repository 120 may be an integral component of the server 106.

The operational repository 120 may be used by the server 106 to store, temporarily or permanently, data generated during the training phase of the MLA 130 and during the in-use phase of the MLA 130. What type of data is generated during the training phase and during the in-use phase of the MLA 130 will be described in greater details herein further below.

Overview of MLAs, Decision Tree MLAs & Gradient Boosting

There are many different types of MLAs known in the art. Broadly speaking, there are three types of MLAs: supervised learning based MLAs, unsupervised learning based MLAs and reinforcement learning based MLAs.

Supervised learning MLA process is based on a target—outcome variable (or dependent variable), which is to be predicted from a given set of predictors (independent variables). Using these set of variables, the MLA (during training) generates a function that maps inputs to desired outputs. The training process continues until the MLA achieves a desired level of accuracy on the validation data. Examples of supervised learning based MLAs include: Regression, Decision trees, Random Forest, Logistic Regression, etc.

Broadly speaking, a "Decision-tree" MLA is an example of supervised learning type of MLAs. This type of MLAs uses a decision tree (as a predictive model) to go from observations about an item (represented in the branches) to conclusions about the item's target value (represented in the leaves). Tree models where the target variable can take a discrete set of values are called classification trees; in these tree structures, leaves represent class labels and branches represent conjunctions of features that lead to those class labels. Decision trees where the target variable can take continuous values (typically real numbers) are called regression trees.

In order for the decision-tree MLA to work, it needs to be "built" or trained using a training set of objects containing a large plurality of training objects (such as documents, events, or the like). It is contemplated that in at least some embodiments of the present technology, the MLA 130 may be implemented as a given decision-tree MLA.

One possible method, inter alia, of training a decision-tree MLA will now be discussed.

Gradient boosting is one approach to building an MLA based on decision trees, whereby a prediction model in the form of an ensemble of trees is generated. The ensemble of trees is built in a stage-wise manner. Each subsequent decision tree in the ensemble of decision trees focuses training on those previous decision tree iterations that were "weak learners" in the previous iteration(s) of the decision trees ensemble (i.e. those that are associated with poor prediction/high error).

Generally speaking, boosting is a method aimed at enhancing prediction quality of the MLA. In this scenario, rather than relying on a prediction of a single trained algorithm (i.e. a single decision tree) the system uses many trained algorithms (i.e. an ensemble of decision trees), and makes a final decision based on multiple prediction outcomes of those algorithms.

In boosting of decision trees, the MLA first builds a first tree, then a second tree, which enhances the prediction outcome of the first tree, then a third tree, which enhances the prediction outcome of the first two trees and so on. Thus, the MLA in a sense is creating an ensemble of decision trees, where each subsequent tree is better than the previous, specifically focusing on the weak learners of the previous iterations of the decision trees. Put another way, each tree is built on the same training set of training objects, however training objects, in which the first tree made "mistakes" in predicting are prioritized when building the second tree, etc. These "tough" training objects (the ones that previous iterations of the decision trees predict less accurately) are weighted with higher weights than those where a previous tree made satisfactory prediction.

It should be noted that in some embodiments of the present technology, the server 106 may make use of a variety of different algorithms during training of the MLA 130 (e.g., building of trees). Just as an example, the server 106 may make use of greedy algorithms during building of trees of the MLA 130. It is contemplated that in at least some embodiments of the present technology, the MLA 130 may be implemented as a Gradient Boosted Decision Tree (GBDT) algorithm.

How the server 106 is configured to train the MLA 130 will now be described in greater details.

Training Phase of the MLA

Figure 4:
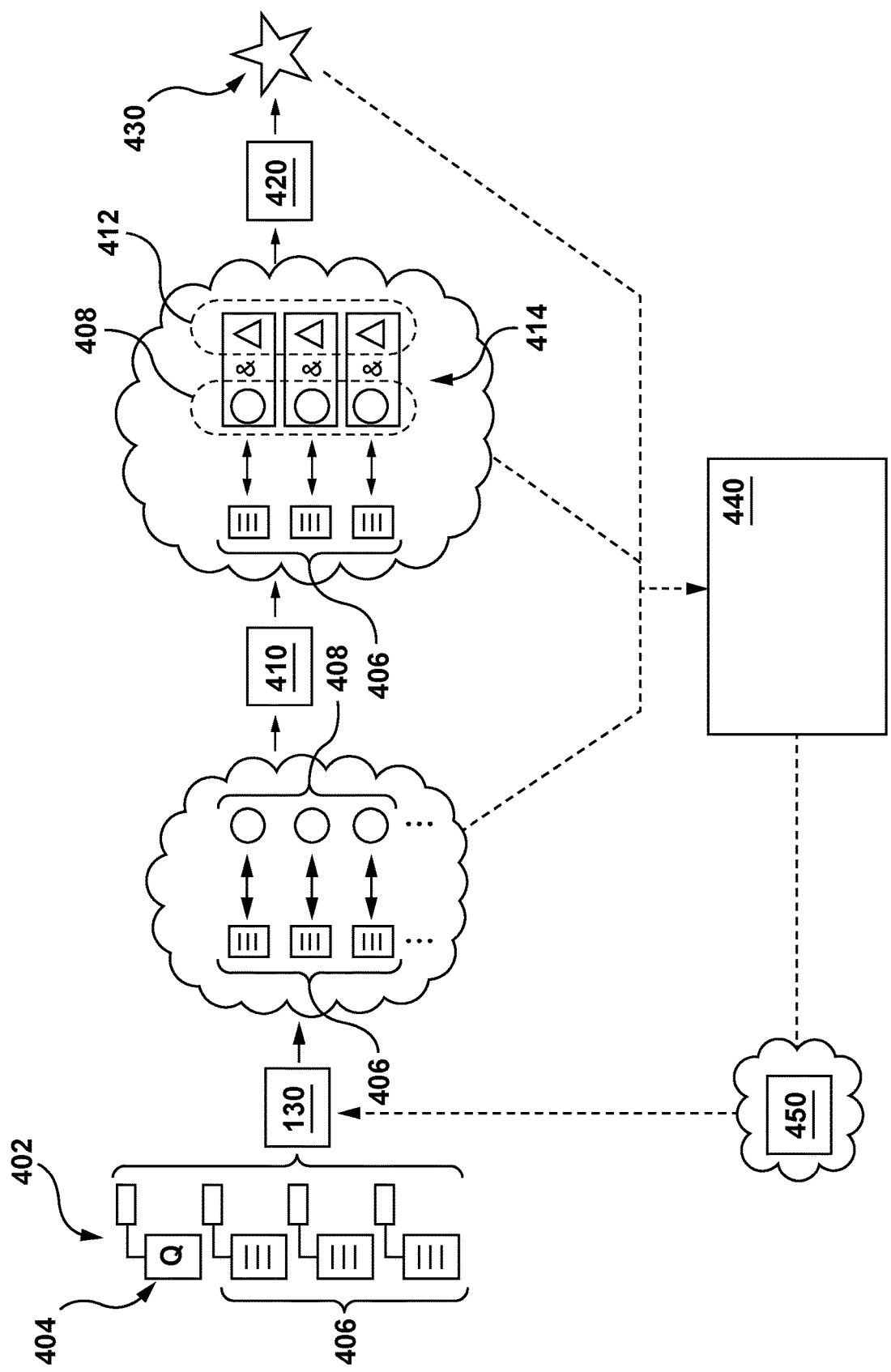
FIG. 4 is a schematic illustration of a given training iteration of a Machine Learning Algorithm (MLA) of FIG. 1 in accordance with non-limiting embodiments of the present technology.

With reference to FIG. 4, there is depicted a schematic illustration of a given training iteration of the MLA 130. It should be noted that, although only a single training iteration of the MLA 130 will be described herein below, during the training phase of the MLA 130 the server 106 may be configured to perform a large number of training iteration similarly to how the given training iteration is performed.

During the given training iteration, the server 106 is configured to input training data 402 into the MLA 130.

The training data 402 includes data associated with a training query 404 and data associated with a set of training documents 406. For example, the server 106 may be configured to retrieve data associated with the training query 404 (e.g., a set of features associated with the training query 404) and the data associated with the set of training documents 406 (e.g., a set of features associated with a respective one of the set of the training documents 406) from the search engine data repository 110.

In response to the server 106 inputting the training data 402, the MLA 130 is configured to generate relevance scores for the set of training documents 406. For example, the MLA 130 may be configured to generate a set of relevance scores 408 including a given relevance score for a respective one of the set of training documents 406.

It should be noted that, as previously alluded to above, a given relevance score in the set of relevance scores is indicative of an estimated relevance of the respective training document from the set of training documents 406 to the training query 404.

As part of the given training iteration of the MLA 130, the server 106 may also be configured to execute a noise-inducing function 410. Broadly speaking, the server 106 may be configured to employ the noise-inducing function 410 for generating "noise values" for the set of relevance scores 408 in accordance with a pre-determined distribution. Put another way, the server 106 may be configured to generate noise values for the set of relevance scores 408 based on the noise-inducing function 410 having the pre-determined distribution.

It should be noted that the distribution of the noise-inducing function 410 may be pre-determined by an operator of the search engine. Just as examples, the pre-determined distribution of the noise-inducing function 410 may be at least one of:

a Gaussian distribution;
a Cauchy distribution; and
a Laplace distribution.

In summary, by employing the MLA 130 and the noise-inducing function 410, the server 106 is configured to generate for the set of training documents 406:

(i) the set of relevance scores 408; and
(ii) a set of noise values 412.

It can be said that in at least some embodiments, the server 106 may be configured to generate noise-induced relevance scores for training documents by combining respective relevance scores and respective noise values. For example, the server 106 may be configured to generate a set of noise-induced relevance scores 414 for the set of training documents where a given noise-induced relevance score from the set of noise-induced relevance scores 414 is a combination of a respective relevance score (obtained from the MLA 130) and a respective noise value (obtained from the noise-inducing function 410).

Also as part of the given training iteration, as previously alluded to above, the server 106 may also be configured to execute a ranking quality metric function. For example, the server 106 may be configured to employ the ranking quality metric function 420 for generating a performance score 430 based on the set of noise-induced relevance scores 414.

It should be noted that, as explained above, this performance score 430 is indicative of a ranking quality of the MLA 130 as if the training documents from the set of training documents 406 are ranked in accordance with the respective noise-induced relevance scores from the set of noise-induced relevance scores 414.

Once the performance score 430 for the MLA 130 is generated, the server 106 may be configured to perform a policy gradient determination procedure 440. Broadly speaking, the purpose of the policy gradient determination procedure 440 is to determine a "policy gradient value" that is to be used for adjusting the MLA 130 (e.g., via gradient boosting, for example) for better estimating the relevance of training documents during a next training iteration or of in-use documents during an in-use phase of the MLA 130. For example, by executing the policy gradient determination procedure 440, the server 106 is configured to determine a policy gradient value 450 based on a combination of (i) the performance score 430, (ii) the relevance scores 408, and (iii) the noise-induced relevance scores 414 for the set of training objects 406.

Developers of the present technology have realized that generating the performance score 430 based on the set of noise-induced relevance scores 414, as opposed to based on the set relevance scores 408, may allow determination of the policy gradient value 450. It can be said that inducing noise into the set of relevance scores 408 may allow to, in a sense, "smooth out" the ranking quality metric function 420 and, thus, enable calculation of a policy gradient value.

As mentioned above, the ranking quality metric function 420 is one of a flat and a discontinuous function and, hence, calculating a policy gradient value of such a function may be unfeasible unless this function is smoothed, as in this case, by the introduction of noise into the set of relevance scores 408.

In some embodiments of the present technology, it is contemplated that employing the set of noise-induced relevance scores 414 instead of the set of relevance scores 408 for generating the performance score 430 may allow smoothing the ranking quality metric function 420.

The execution of the policy gradient determination procedure 440 may be performed by the server 106 in a variety of ways. This means that the server 106 may be configured to employ different methods for determining the policy gradient value 450.

In a first embodiment, the server 106 may employ a coordinate-wise antithetic sampling method, as part of the policy gradient determination procedure 440, for determining the policy gradient value 450. For example, the server 106 may make use of the following equations (1) to (4) for determining the policy gradient value 450:

$$d_i = \frac{1}{K}\sum_{j=1}^{K} \frac{\wp_j - f(r + n_j^i)}{2} n_{ji} \quad (1)$$

$$\text{wherein } \wp_j = f(r + n_j) \quad (2)$$

-continued $$\text{wherein } r = [r_1, \ldots\ldots, r_i, \ldots, r_m] \quad (3)$$

and $$\text{wherein } n_j^i = [n_{j1}, \ldots\ldots, -n_{ji}, \ldots, n_{jm}] \quad (4)$$

wherein $\wp_j = f(r+n_j)$      (2)

wherein $r = [r_1, \ldots, r_i, \ldots, r_m]$      (3)

and wherein $n_j^i = [n_{j1}, \ldots, -n_{ji}, \ldots, n_{jm}]$      (4)

wherein:
- $d_i$ is the policy gradient value 450 for document i;
- K is a number of noise-induced relevance score samples (e.g., in some cases can be equal to 1);
- j is a given noise-induce relevance score sample (e.g., in some cases only one sample can be performed);
- $\wp_j$ is the performance score for the jth noise-induced relevance score sample;
- r is a vector representative of the set of relevance scores 408 for documents, including document i;
- $n_j$ is a vector representative of the set of noise values 412 for documents, including document i, during the given sample j;
- $n_j^i$ is a vector representative of the set of noise values 412 for documents, including document i, where a sign of the noise value for the document i during the given sample j (e.g., $n_{ji}$) is inversed (e.g., negative sign);
- $n_{ji}$ is a noise value for the document i during the given sample; and
- f( ) is the ranking quality metric function 420.

Once the policy gradient value 450 is determined by the server 106 via the policy gradient determination procedure 440, the server 106 may be configured to apply the policy gradient value 450 for training the MLA 130.

In some embodiments, the server 106 may be configured to apply a weighted policy gradient value for training the MLA 130. For example, the weighted policy gradient value may be determined by the server 106 as a combination of the policy gradient value 450 and a pre-determined weight value.

In some embodiments, the weighted policy gradient value may be determined by the server 106 as a hyperparameter, which is a parameter whose value is set before the learning process begins. In such a case, the weighted policy gradient value may be determined based on exhaustive search based on a predetermined dedicated dataset. It can be said that the weighted value may be set by an operator of the server 106 before the learning process begins. It is contemplated that the weight value may be determined empirically before the learning process begins and based on a given dedicated dataset. In some embodiments, it can be said that the holdout dataset may be a distinct training dataset from the main training dataset used during the learning process.

In some embodiments, where the MLA 130 is a decision-tree algorithm such as a GBDT based algorithm, for example, the server 106 applying the policy gradient value 450 (or the weighted policy gradient value) may be configured to generate an additional decision-tree for the MLA 130 based on the policy gradient value 450 (or the weighted policy gradient value).

In other embodiments, however, the server 106 applying the policy gradient value 450 (or the weighted policy gradient value) may be configured to modify an existing decision-tree for the MLA 130 based on the policy gradient value 450 (or the weighted policy gradient value).

It can be said that so-applying the policy gradient value 450 (or the weighted policy gradient value) for training the MLA 130 results in a direct optimization of the ranking quality of the MLA 130.

It is contemplated that the server 106 may be configured to apply the policy gradient value 450 (or the weighted policy gradient value) for training the MLA 130 in an off-line mode. It is contemplated that the server 106 may be configured to apply the policy gradient value 450 (or the weighted policy gradient value) prior to employing the MLA 130 in an in-use phase. How the server 106 is configured employ the MLA 130 during its in-use phase will now be described.

In-Use Phase of the MLA

Once the MLA 130 has been trained, the server 106 may be configured to employ the MLA 130 during its in-use phase. For example, the server 106 may employ the MLA 130 in an on-line mode—that is, during operation of the search engine for provision of SERPs to users in response to requests similar to the query data-packet 150 (see FIG. 1).

Figure 2:
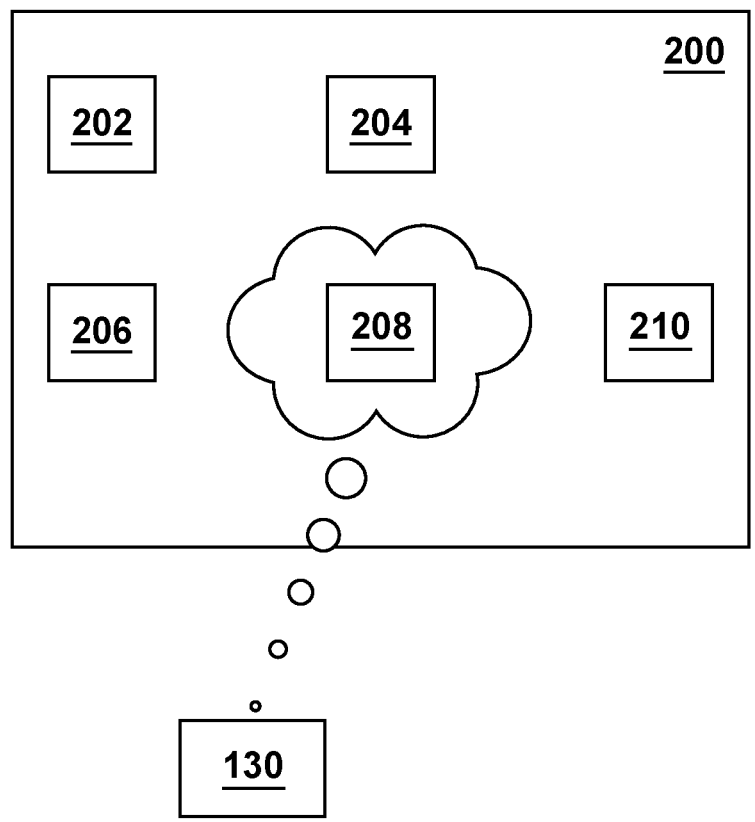
FIG. 2 depicts a plurality of computer-implemented procedures employed by a server of FIG. 1 in accordance with non-limiting embodiments of the present technology.

Once the query data-packet 150 is acquired by the server 106, the server 106 may be configured to execute at least some of the plurality of computer-implemented procedures 200 (see FIG. 2). For example, the server 106 may be configured to execute the querying procedure 206, the relevance estimation procedure 208, and the SERP generation procedure 210.

To better illustrate this, the server 106 may execute the querying procedure 206 for identifying documents that may contain some part of a given query submitted to the given search engine via the query data-packet 150. As such, the server 106 may be configured to identify the in-use documents (in-use objects) in response to the in-use query (current query acquired via the query data-packet 150).

Once the in-use documents are identified, the server 106 may execute the relevance estimation procedure 208, during which the now-trained MLA 130 is used during its in-use phase to (i) generate relevance scores for the in-use documents which are indicative of respective relevance to the in-use query and (ii) rank the in-use documents in response to the in-use query based on the so-generated relevance scores.

Once the in-use documents are so ranked via use of the MLA 130 by the server 106, the server 106 may execute the SERP generation procedure 210 for triggering display of relevant information to the user 102 in response to the current query. For example, the server 106 may be configured to generate a given SERP (e.g., an electronic document representative of the given SERP) that lists a number of search results representative of the documents that have been ranked during the previous computer-implemented procedure.

The server 106 may then be configured to generate the SERP data-packet 160 (see FIG. 1) that comprises data in a form of then electronic document representative of the given SERP and data that is instrumental in triggering the display of the SERP on the electronic device 104 based on the electronic document included in the SERP data-packet 160. Hence, the given SERP displayed to the user 102 includes a list of the in-use documents as ranked by the server 106 employing the MLA 130.

Computer-Implemented Method

Figure 5:
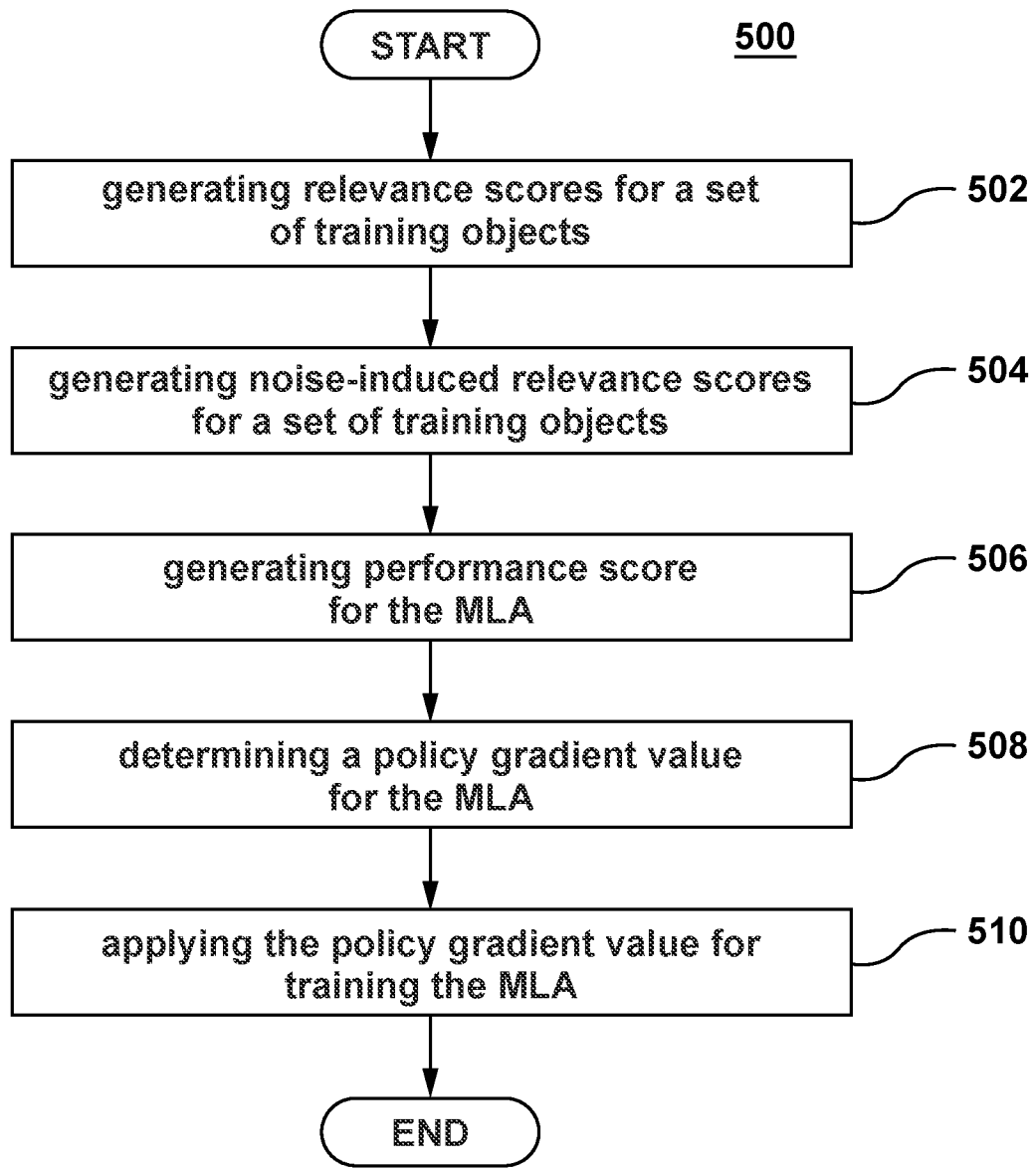
FIG. 5 is a schematic block diagram of a flow chart of a method of training the MLA for ranking objects in response to a query in accordance with non-limiting embodiments of the present technology.

With reference to FIG. 5 there is depicted a scheme-block representation of a computer-implemented method 500 of training the MLA 130 for ranking objects in response to a query. In some embodiments of the present technology, the computer-implemented method 500 may be executed by the server 106 (see FIG. 1). Various steps of the method 500 will now be described in greater details herein below.

Step 502: Generating Relevance Scores for a Set of Training Objects

The method 500 begins at step 502 with the server 106 being configured to employ the MLA 130 to generate the set of relevance scores 408 for the set of training documents 406. As explained above and illustrated in FIG. 4, the MLA 130 is configured to generate the set of relevance scores 408 for the set of training documents 406 based on data associated with (i) the set of training documents 406 and (ii) the training query 404. It should be noted that the relevance scores from the set of relevance scores 408 are indicative of an estimated relevance of a respective training document from the set of training documents 406 to the training query 404.

Again, as previously alluded to, the MLA 130 may be configured to generate relevance scores for other types of training objects than electronic documents. This means that the training objects employed during training of the MLA 130 may be inter alia electronic documents and the training query 404 may a previously submitted query to the search engine hosted on the server 106.

Step 504: Generating Noise-Induced Relevance Scores for a Set of Training Objects The method 500 continues to step 504 with the server 106 being configured to generate the set of noise-induced relevance scores 414 for the set of training documents 406.

To that end, in some embodiments, the server 106 may employ the noise-inducing function 410 for generating the set of noise values 412. As such, in some embodiments, the server 106 may be configured to generate the set of noise-induced relevance scores 414 by combining the set of relevance scores 408 and the set of noise values 412 as depicted in FIG. 4.

It should be noted that the noise-inducing function 420 has a pre-determined distribution that may be at least one of a Gaussian distribution, a Cauchy distribution, and a Laplace distribution.

Step 506: Generating Performance Score for the MLA

The method 500 continues to step 506 with the server 106 being configured to generate the performance score 430 for the MLA 130 based on the set of noise-induced relevance scores 414. It should be noted that the performance score 430 is indicative of a ranking quality of the MLA 130 if the training documents from the set of training documents 406 are ranked in accordance with the respective noise-induced relevance scores from the set of noise-induced relevance scores 414.

It is contemplated that the server 106 may be configured to generate the performance score 430 by employing the ranking quality metric function 420. The ranking quality metric function is one of a flat and a discontinuous function. As mentioned above, in some embodiments the ranking quality metric function 420 may be one of: a NDCG quality metric function, an ERR quality metric function, a MAP quality metric function, and a MRR quality metric function.

It is also contemplated that, in other embodiments, generating the performance score 430 by the server 106 based on the set of noise-induced relevance scores 414 (as opposed to the set of relevance scores 408) may allow determining the policy gradient value 450 at a further step of the method 500.

Step 508: Determining a Policy Gradient Value for the MLA

The method 500 continues to step 508 with the server 106 being configured to determine the policy gradient value 450 for adjusting relevance scores to be generated by the MLA 130 for the in-use documents (and/or other types of in-use objects) in response to an in-use query.

It is contemplated that the server 106 may be configured to perform the policy gradient determination procedure 440 during the step 508. Broadly speaking, the purpose of the policy gradient determination procedure 440 is to determine the policy gradient value 450 that is to be used for adjusting the MLA 130 (e.g., via gradient boosting, for example) for better estimating the relevance of training documents during a next training iteration or of in-use documents during an in-use phase of the MLA 130. For example, by executing the policy gradient determination procedure 440, the server 106 may be configured to determine the policy gradient value 450 based on the combination of (i) the performance score 430, (ii) the relevance scores 408, and (iii) the noise-induced relevance scores 414 for the set of training objects 406, as explained above.

In at least some embodiments of the present technology, the server 106 may be configured to determine the policy gradient value 450 by estimating it via the coordinate-wise antithetic sampling method—that is, the server 106 may estimate the policy gradient value 450 by employing the coordinate-wise antithetic sampling method. For example, the server 106 may estimate the policy gradient value 450 in accordance with the equation 1.

Step 510: Applying the Policy Gradient Value for Training the MLA

The method 500 continues to step 510 with the server 106 being configured to apply the policy gradient value 450 for training the MLA 130 to rank the in-use documents in response to the in-use query.

In some embodiments, the server 106 may be configured to apply the weighted policy gradient value for training the MLA 130 which is a combination of (i) the policy gradient value 450 and (ii) the pre-determined weight value, as explained above.

As previously alluded to, the MLA 130 may be a decision-tree-based algorithm having a set of decision trees. In such a case, the server 106 applying the policy gradient value 450 may be configured to at least one of (i) generate an additional decision-tree for the MLA 130 based on the policy gradient value 450, and (ii) modify at least one of the set of decision-trees of the MLA 130 based on the policy gradient value 450.

It is contemplated that the server 106 applying the policy gradient value 450 for training the MLA 130 may directly optimize the ranking quality of the MLA 130. In addition, the server 106 may be configured to apply the policy gradient value 450 in an off-line mode. Also, the server 106 may be configured to apply the policy gradient value 450 prior to employing the MLA 130 in the in-use phase thereof.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for training a Machine Learning Algorithm (MLA) for ranking objects in response to a query, the MLA being executed by a server having access to the objects and the query, the training including use of a ranking quality metric function that is one of a flat and a discontinuous function to determine a performance score of the MLA, the method executable by the server, the method comprising:

generating, by the server executing the MLA, relevance scores for a set of training objects based on data associated with (i) the set of training objects and (ii) a training query,
the relevance scores being indicative of an estimated relevance of a respective training object to the training query;
generating, by the server, noise-induced relevance scores for the set of training objects by combining the relevance scores and noise values,
the noise values having been generated based on a noise-inducing function having a pre-determined distribution;
generating, by the server, the performance score for the MLA based on the noise-induced relevance scores,
the performance score being indicative of a ranking quality of the MLA if the training objects from the set of training objects are ranked in accordance with the respective noise-induced relevance scores;
determining, by the server, a policy gradient value for adjusting relevance scores to be generated by the MLA, wherein the policy gradient value is determined as:

$$d_i = \frac{1}{K} \sum_{j=1}^{K} \frac{\wp_j - f(r + n_j^i)}{2} n_{ji}$$

wherein:
$d_i$ is a policy gradient value for training object i in the set of training objects;
K is a number of noise-induced relevance score samples;
j is a given noise-induce relevance score sample;
$\wp_j$ is a performance score for a jth noise-induced relevance score sample;
r is a vector representative of the set of relevance scores for the set of training objects, including the training object i;
$n_j$ is a vector representative of a set of noise values for the set of training objects, including the training object i, during the given sample j;
$n_j^i$ is a vector representative of a set of noise values for the set of training objects, including the training object i, where a sign of a noise value for the training object i during the given sample j is inversed;
$n_{ji}$ is a noise value for the training object i during the given sample j; and
f( ) is the ranking quality metric function; and
applying, by the server, the policy gradient value for training the MLA to rank in-use objects in response to an in-use query.

2. The method of claim 1, wherein the generating the performance score based on the noise-induced relevance scores allows the determining the policy gradient value.

3. The method of claim 1, wherein the applying the policy gradient value comprises:
applying, by the server, a weighted policy gradient value for training the MLA,
the weighted policy gradient being determined as a combination of (i) the policy gradient value and (ii) a pre-determined weight value.

4. The method of claim 1, wherein the MLA is a decision-tree-based algorithm having a set of decision trees, and wherein the applying the policy gradient value comprises at least one of:

generating, by the server, an additional decision-tree for the MLA based on the policy gradient value; and
modifying, by the server, at least one of the set of decision-trees of the MLA based on the policy gradient value.

5. The method of claim 1, wherein the applying the policy gradient value for training directly optimizes the ranking quality of the MLA.

6. The method of claim 1, wherein the determining the policy gradient value comprises estimating, by the server, the policy gradient value by employing a coordinate-wise antithetic sampling method.

7. The method of claim 1, wherein the applying the policy gradient value is performed by the server in an off-line mode.

8. The method of claim 1, wherein the applying the policy gradient value is performed by the server prior to employing the MLA in an in-use phase.

9. The method of claim 1, wherein the pre-determined distribution is at least one of:
a Gaussian distribution;
a Cauchy distribution; and
a Laplace distribution.

10. The method of claim 1, wherein the ranking quality metric function is one of:
a Normalized Discounted Cumulative Gain (NDCG) quality metric function;
an Expected reciprocal Rank (ERR) quality metric function;
a Mean Average Precision (MAP) quality metric function; and
a Mean Reciprocal Rank (MRR) quality metric function.

11. The method of claim 1, wherein the training objects are electronic documents and the training query is a previously submitted query to a search engine, the search engine being hosted on the server.

12. The method of claim 1, wherein the method further comprises:
ranking, by the server, the in-use objects in response to the in-use query; and
triggering, by the server, display of a Search Engine Results Page (SERP) to a user associated with the in-use query, the SERP listing the in-use objects in a ranked order.

13. A server for training a Machine Learning Algorithm (MLA) for ranking objects in response to a query, the MLA being executed by the server having access to the objects and the query, the training including use of a ranking quality metric function that is one of a flat and a discontinuous function to determine a performance score of the MLA, the server comprising at least one processor and memory comprising executable instructions which, when executed by the at least one processor, cause the server to:
generate, by executing the MLA, relevance scores for a set of training objects based on data associated with (i) the set of training objects and (ii) a training query,
the relevance scores being indicative of an estimated relevance of a respective training object to the training query;
generate noise-induced relevance scores for the set of training objects by combining the relevance scores and noise values,
the noise values having been generated based on a noise-inducing function having a pre-determined distribution;
generate the performance score for the MLA based on the noise-induced relevance scores, the performance score being indicative of a ranking quality of the MLA if the training objects from the set of training objects are ranked in accordance with the respective noise-induced relevance scores;

determine a policy gradient value for adjusting relevance scores to be generated by the MLA, wherein the policy gradient value is determined as:

$$d_i = \frac{1}{K}\sum_{j=1}^{K}\frac{\wp_j - f(r + n_j^i)}{2}n_{ji}$$

wherein:
d$_i$ is a policy gradient value for training object i in the set of training objects;
K is a number of noise-induced relevance score samples;
j is a given noise-induce relevance score sample;
$\wp_j$ is a performance score for a jth noise-induced relevance score sample;
r is a vector representative of the set of relevance scores for the set of training objects, including the training object i;
n$_j$ is a vector representative of a set of noise values for the set of training objects, including the training object i, during the given sample j;
n$_j^i$ is a vector representative of a set of noise values for the set of training objects, including the training object i, where a sign of a noise value for the training object i during the given sample j is inversed;
n$_{ji}$ is a noise value for the training object i during the given sample j; and
f( ) is the ranking quality metric function; and
apply the policy gradient value for training the MLA to rank in-use objects in response to an in-use query.

14. The server of claim 13, wherein to apply the policy gradient value comprises the server configured to:
apply a weighted policy gradient value for training the MLA,
the weighted policy gradient being determined as a combination of (i) the policy gradient value and (ii) a pre-determined weight value.

15. The server of claim 13, wherein the MLA is a decision-tree-based algorithm having a set of decision trees, and wherein to apply the policy gradient value comprises the server configured to at least one of:
generate an additional decision-tree for the MLA based on the policy gradient value; and
modify at least one of the set of decision-trees of the MLA based on the policy gradient value.

16. The server of claim 13, wherein to apply the policy gradient value for training directly optimizes the ranking quality of the MLA.

17. The server of claim 13, wherein to determine the policy gradient value comprises the server being configured to estimate the policy gradient value by employing a coordinate-wise antithetic sampling method.

18. The server of claim 13, wherein the server is further configured to:
rank the in-use objects in response to the in-use query; and
trigger display of a Search Engine Results Page (SERP) to a user associated with the in-use query, the SERP listing the in-use objects in a ranked order.

19. A non-transitory computer-readable medium having stored thereon computer-executable instructions for training a Machine Learning Algorithm (MLA) for ranking objects in response to a query, the MLA being executed by a server having access to the objects and the query, the training including use of a ranking quality metric function that is one of a flat and a discontinuous function to determine a performance score of the MLA, the instructions, when executed, cause:
generating, by the server executing the MLA, relevance scores for a set of training objects based on data associated with (i) the set of training objects and (ii) a training query,
the relevance scores being indicative of an estimated relevance of a respective training object to the training query;
generating, by the server, noise-induced relevance scores for the set of training objects by combining the relevance scores and noise values,
the noise values having been generated based on a noise-inducing function having a pre-determined distribution;
generating, by the server, the performance score for the MLA based on the noise-induced relevance scores,
the performance score being indicative of a ranking quality of the MLA if the training objects from the set of training objects are ranked in accordance with the respective noise-induced relevance scores;
determining, by the server, a policy gradient value for adjusting relevance scores to be generated by the MLA, wherein the policy gradient value is determined as:

$$d_i = \frac{1}{K}\sum_{j=1}^{K}\frac{\mathcal{P}_j - f(r + n_j^i)}{2}n_{ji}$$

wherein:
d$_i$ is a policy gradient value for training object i in the set of training objects;
K is a number of noise-induced relevance score samples;
j is a given noise-induce relevance score sample;
$\wp_j$ is a performance score for a jth noise-induced relevance score sample;
r is a vector representative of the set of relevance scores for the set of training objects, including the training object i;
n$_j$ is a vector representative of a set of noise values for the set of training objects, including the training object i, during the given sample j;
n$_j^i$ is a vector representative of a set of noise values for the set of training objects, including the training object i, where a sign of a noise value for the training object i during the given sample j is inversed;
n$_{ji}$ is a noise value for the training object i during the given sample j; and
f( ) is the ranking quality metric function; and
applying, by the server, the policy gradient value for training the MLA to rank in-use objects in response to an in-use query.

* * * * *